Figure 3:
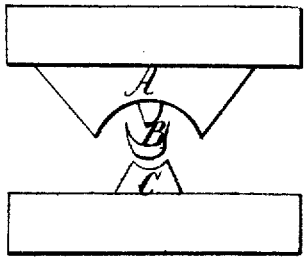
Figure 2:
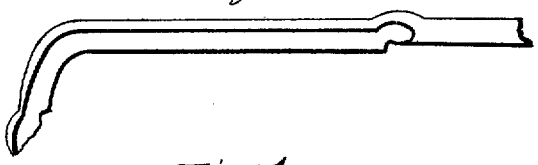
Figure 1:
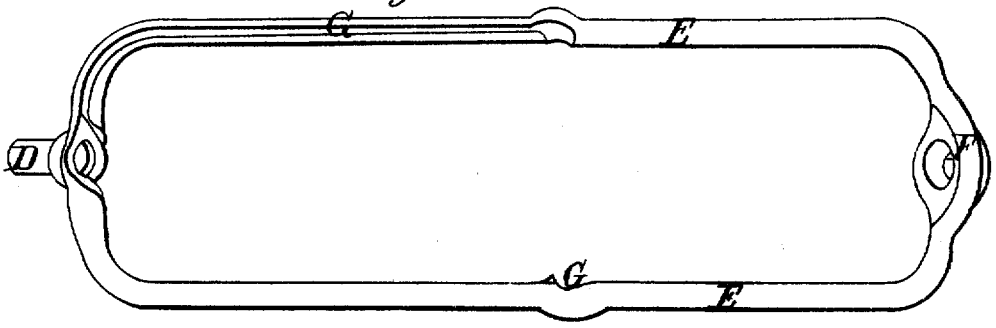

No Printed Specification Available

8117X

O. Pettee.

Spinning Flyer.

Patented Mar. 28, 1834.

N. PETERS, PHOTO-LITHOGRAPHER, WASHINGTON, D. C.

Mar 28, 1834 8117X

Otis Pettee. Newton Massachusetts

Letters Patent

The Schedule referred to in these Letters Patent and making part
of the containing a description in the words of the said Otis Pettee him
self of his improvement in the construction of Fliers of double speeders.

To all to whom these presents shall come. Otis Pettee of Newton
in the County of Middlesex and Commonwealth of Massachusetts,
Machinist sends Greeting. Be it known that I the said Otis
Pettee have invented constructed and applied to use a new and use
ful improvement in the construction of fliers of double speeders
My said improvement consists in making all the parts of a flier
of a single piece of maleable cast iron in the manner hereinaf
ter described — The only way of making fliers for double speeders
heretofore practiced within my knowledge is to make the arms of
wrought iron, the noses of steel the bottoms of wrought iron or steel and the tubes of copper. The noses are joined
with braziers solder. The tubes are attached with tinman's solder &
the bottoms are fastened by Rivetting — Definitions of the parts of a com
mon double speeder flier. Nose bearing at the top having a hole thro the
centre for the passage of the roving. Arms Parts which hold the tubes
and extend to the bottom forming the top sides of the flier —
Bottom. Plate which connects the arms at the lower extremity
having a hole in the centre to admit the hub of the gear or pulley which
gives motion. Tubes hollow grooves on the inner sides of the arms
extending a little more than half way from the nose to the bottom
My improved flier is constructed as follows — The part which
forms the nose is cast solid. From thence the arms as far as the tubes
extend are cast with a hollow groove on one side somewhat resem
bling the pod of an auger. These grooves being partially closed form
the tubes thro which the roving passes in the same manner as
in the old method. At the junction of the arms with the bot
tom

8117X the corners are turned or rounded to give additional strength and stiffness. In the process of finishing the flue one of the principal operations to be performed is that of straightening and forming into proper shape to effect which a pair of heavy dies is provided the upper and nether dies being exactly alike. The flue is then heated and while hot is laid into the nether die; when the upper die which had previously been lifted up two or three feet high is allowed to fall and by its percussion effects the object. It is hardly necessary to state that the upper die moves upon guide rods Another important operation is that of closing the tubes which is also effected by a pair of dies of a peculiar form. A tongue is raised on the nether die or rather the nether die consists of a tongue with a hollow on its top. the part of the flue which is intended to form the tube is heated and laid thereon The upper die consists of an inverted hollow groove the width of which is such as to cover each to the sides of the tube in its natural shape in the centre of this groove is a small tongue to prevent the edges of the tube from coming in contact The following is a sectional view of these dies and of the tube between them. The upper die is allowed to fall and by its pressure against the sides of the tubes carries the edges inward until they strike the tongue in the centre which leaves them in the required shape. It is obvious that this pair of dies must be circular at one end to comply with the shape of the top of the flue and that only one side of the flue is operated upon at once. The upper die runs upon guide rods and is allowed to fall a sufficient distance to effect the object at a single blow. The other operations of drilling cutting filing & polishing are common to other purposes. What I claim as my invention and improvement is the application of the material together with the method of making and finishing the flue as above described. In testimony that the above is a true specification of my said invention and improvement I have hereto set my hand the first day of March in the year of our Lord one thousand eight hundred and thirty four Witnesses
[illegible] [illegible]
[illegible] [illegible]

Otis Potter